US009374349B1

(12) United States Patent
Corlett et al.

(10) Patent No.: US 9,374,349 B1
(45) Date of Patent: Jun. 21, 2016

(54) METHODS AND CREDENTIAL SERVERS FOR CONTROLLING ACCESS TO A COMPUTER SYSTEM

(75) Inventors: Douglas Dwyer Corlett, Kirkland, WA (US); Jeffrey Lee Weber, Carnation, WA (US); Todd Andrew Larson, North Bend, WA (US); Ronald Christopher Hagerman, Bellevue, WA (US); Adam D. Jones, Issaquah, WA (US); Frank Huynh, Bellevue, WA (US)

(73) Assignee: The Boeing Company, Chicago, IL (US)

(*) Notice: Subject to any disclaimer, the term of this patent is extended or adjusted under 35 U.S.C. 154(b) by 160 days.

(21) Appl. No.: 13/227,980

(22) Filed: Sep. 8, 2011

(51) Int. Cl.
*G06F 7/04* (2006.01)
*H04L 29/06* (2006.01)
*G06F 21/31* (2013.01)

(52) U.S. Cl.
CPC .............. *H04L 63/08* (2013.01); *G06F 21/31* (2013.01); *H04L 63/083* (2013.01); *H04L 63/0815* (2013.01); *H04L 63/0823* (2013.01)

(58) Field of Classification Search
CPC ..................................................... H04L 63/08
USPC .............................................................. 726/5
See application file for complete search history.

(56) References Cited

U.S. PATENT DOCUMENTS

| | | | |
|---|---|---|---|
| 5,960,085 A | 9/1999 | de la Huerga | |
| 7,552,467 B2 | 6/2009 | Lindsay | |
| 7,571,489 B2 | 8/2009 | Ong et al. | |
| 7,613,929 B2 | 11/2009 | Cohen et al. | |
| 7,703,130 B2 | 4/2010 | Pinkas et al. | |
| 7,941,534 B2 | 5/2011 | de la Huerga | |
| 7,941,836 B2 | 5/2011 | Pinkas et al. | |
| 2004/0187018 A1* | 9/2004 | Owen | G06F 21/31 713/184 |
| 2006/0136739 A1* | 6/2006 | Brock | G06Q 20/322 713/184 |
| 2007/0022196 A1* | 1/2007 | Agrawal | G06F 21/34 709/225 |
| 2007/0203850 A1* | 8/2007 | Singh et al. | 705/67 |
| 2007/0250920 A1* | 10/2007 | Lindsay | 726/7 |
| 2008/0276098 A1* | 11/2008 | Florencio et al. | 713/183 |
| 2009/0259588 A1 | 10/2009 | Lindsay | |
| 2010/0199336 A1* | 8/2010 | Tan | H04L 63/0846 726/6 |
| 2011/0167489 A1* | 7/2011 | Ziv et al. | 726/19 |
| 2012/0011561 A1* | 1/2012 | Courtney et al. | 726/1 |

OTHER PUBLICATIONS

Jing-Chiou Liou et al., "A Feasible and Cost Effective Two-Factor Authentication for Online Transactions," pp. 47-51.*
Shakir Ullah Shah, "New Factor of Authentication: Something you process," IEEE computer society, pp. 102-106.*

* cited by examiner

*Primary Examiner* — Luu Pham
*Assistant Examiner* — Canh Le
(74) *Attorney, Agent, or Firm* — Armstrong Teasdale LLP

(57) ABSTRACT

Methods and credential systems for use in controlling access to a computer system are disclosed. One example method includes receiving a request for a temporary single-factor credential associated with a user account, modifying the user account to allow single-factor authentication to permit access to the computer system, issuing the temporary single-factor credential, wherein the password includes a lifetime, disabling the temporary single-factor credential, when the lifetime ends, such that access to the computer system via the temporary single-factor credential is terminated, and modifying the user account associated to require multi-factor authentication for access to the computer system.

17 Claims, 4 Drawing Sheets

300 ⇘

```
┌─────────────────────────────────────────────────────────────────┐
│  ┌─────────────────────────────────────┐                        │
│  │ Account Information                 │  Action: Request Credential
│  │    Domain: ABC123                   │  Select the reason you need the Credential
│  │      Name: Smith, John              │   ┌──────────────▼┐
│  │   BEMS ID: 123456                   │   └───────────────┘
│  │       UPN: John.Smith123@ABC123.com │    302
│  └─────────────────────────────────────┘  Choose a duration for the Credential
│   308                                                           │
│                                            Duration (hours): ┌──▼┐
│                                                              └───┘
│                                              304                │
│                                                  ┌──────────────┐
│                                                  │ Submit Request│
│                                                  └──────────────┘
│                                                    306          │
└─────────────────────────────────────────────────────────────────┘
```

```
┌─────────────────────────────────────────────────────────────────┐
│  ┌─────────────────────────────────────┐                        │
│  │ Account Information                 │  Your account has an active password.
│  │    Domain: ABC123                   │  You may choose to:    │
│  │      Name: Smith, John              │                        │
│  │   BEMS ID: 123456                   │  Make extension  ┌────────────────┐
│  │       UPN: John.Smith123@ABC123.com │  of credential   │ Extend Credential│
│  └─────────────────────────────────────┘                  └────────────────┘
│                                                              402            │
│                                           Terminate your    ┌────────────────┐
│                                              credential     │ Terminate Credential│
│                                                             └────────────────┘
│                                                                404           │
└─────────────────────────────────────────────────────────────────┘
```

FIG. 4

METHODS AND CREDENTIAL SERVERS FOR CONTROLLING ACCESS TO A COMPUTER SYSTEM

BACKGROUND

The field of the disclosure relates generally to methods and credential systems and, more particularly, to controlling access to a computer system.

Known computer systems generally include various types of information and/or applications, one or both of which are protected from unauthorized access. To provide this protection, computer systems often require entry authentication of a user identity, such as a username and password, prior to granting access to the computer system. In various computer systems, this type of single-factor authentication is determined to be a sufficient identification of the user. In other computer systems, multi-factor authentication is required to provide increased resistance to cracking or stealing of credentials sufficient to access the computer system, as compared to single-factor authentication. Various applications and/or devices are known not to support multi-factor authentication, thereby impeding implementation of system-wide requirements for multi-factor authentication.

BRIEF DESCRIPTION

In one aspect, a method for use in controlling access to computer system is provided. The method includes receiving a request for a temporary single-factor credential associated with a user account, modifying the user account to permit single-factor authentication for access to the computer system, and issuing the temporary single-factor credential. The password includes a lifetime. The method includes disabling the temporary single-factor credential, when the lifetime ends, such that access to the computer system via the temporary single-factor credential is terminated, and modifying the user account to require multi-factor authentication for access to the computer system.

In another aspect, a credential server for use in controlling access to a computer system is disclosed. The credential server includes a memory device storing a user account and a processor coupled to the memory device. The processor is configured to receive a request for a temporary single-factor credential associated with the user account, modify the user account to permit single-factor authentication for access to the computer system, issue the temporary single-factor credential having a lifetime, disable the temporary single-factor credential, when the lifetime ends, such that access to the computer system via the temporary single-factor credential is terminated, and modify the user account associated to require multi-factor authentication for access to the computer system.

In yet another aspect, one or more non-transitory computer-readable storage media having computer-executable instructions embodiments thereon is disclosed. When executed by at least one processor, the computer-executable instructions cause the at least one processor to receive a request for a temporary single-factor credential associated with a user account, modify the user account to permit single-factor authentication for access to the computer system, issue the temporary single-factor credential having a lifetime, modify the user account associated to permit single-factor authentication for access to the computer system, and disable the temporary single-factor credential, when the lifetime ends, such that access to the computer system via the temporary single-factor credential is terminated.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 3 illustrates an exemplary user interface for use in requesting a temporary single-factor credential.

FIG. 4 illustrates an exemplary user interface for use in requesting an extension of a temporary single-factor credential.

DETAILED DESCRIPTION

The subject matter described herein relates generally to controlling access to a computer system substantially requiring multi-factor authentication, by permitting a user to access the computer system through use of a temporary single-factor credential.

In one embodiment, technical effects of the methods, systems, and computer-readable media described herein include at least one of: (a) receiving a request for a temporary single-factor credential associated with a user account, (b) (b) modifying the user account to permit single-factor authentication for access to the computer system, (c) issuing the temporary single-factor credential, wherein the password includes a lifetime, (d) disabling the temporary single-factor credential, when the lifetime ends, such that access to the computer system via the temporary single-factor credential is terminated, and (e) modifying the user account associated to require multi-factor authentication for access to the computer system.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
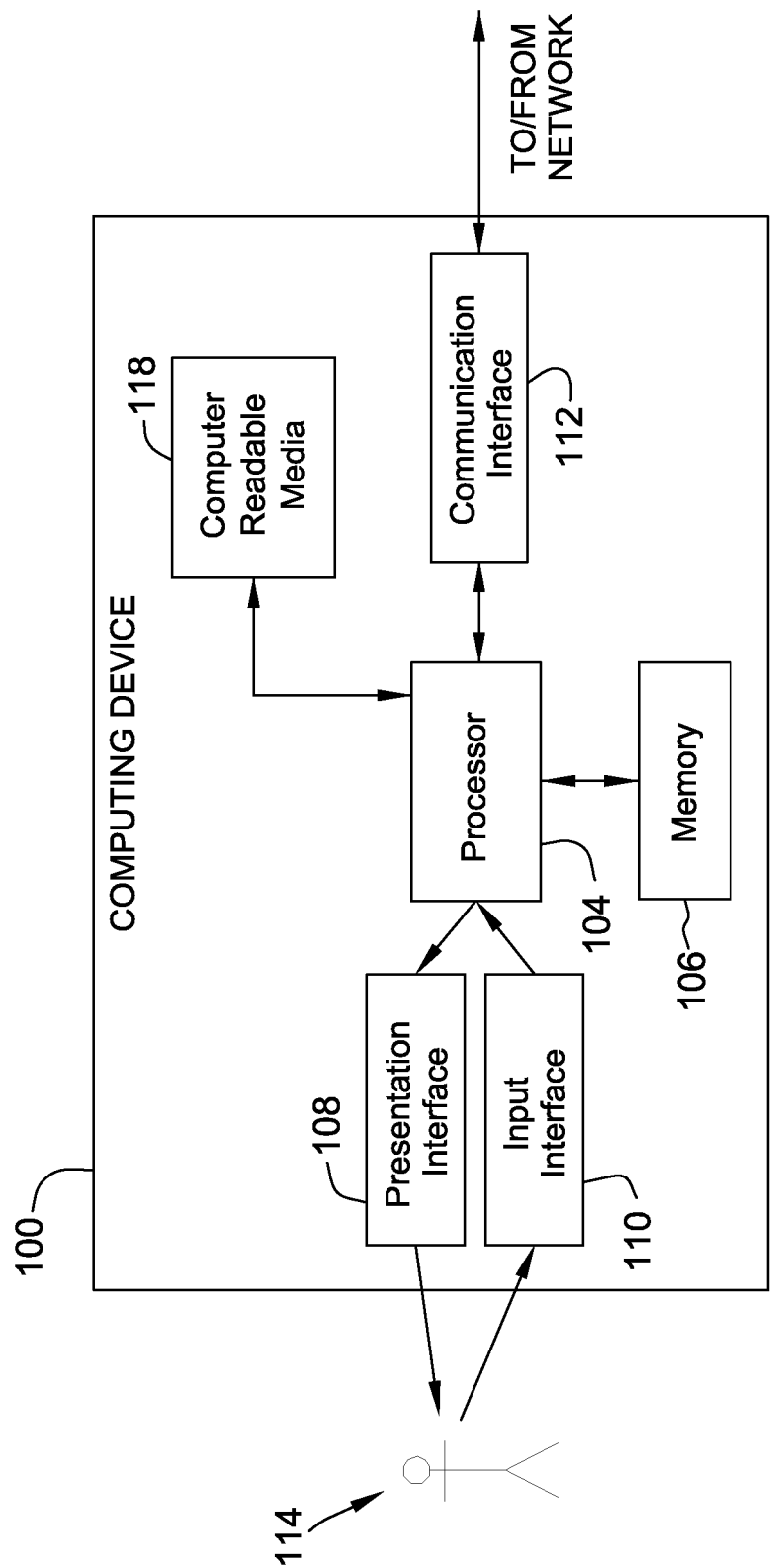
FIG. 1 is a block diagram of an exemplary computing device.

FIG. 1 is a block diagram of an exemplary computing device 100 that may be used to automatically generate a production operating system. In the exemplary embodiment, computing device 100 includes a memory 106 and a processor 104 that is coupled to memory 106 for executing programmed instructions. Processor 104 may include one or more processing units (e.g., in a multi-core configuration). Computing device 100 is programmable to perform one or more operations described herein by programming memory 106 and/or processor 104. For example, processor 104 may be programmed by encoding an operation as one or more executable instructions and providing the executable instructions in memory device 106.

Processor 104 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 104, cause processor 104 to perform at least a portion of the methods described herein. The above examples are exemplary only, and thus are not intended to limit in any way the definition and/or meaning of the term processor.

Memory device 106, as described herein, is one or more devices that enable information such as executable instructions and/or other data to be stored and retrieved. Memory device 106 may include one or more computer-readable media, such as, without limitation, dynamic random access memory (DRAM), static random access memory (SRAM), a solid state disk, and/or a hard disk. Memory device 106 may be configured to store, without limitation, executable instructions, operating systems, hardware profiles, resources, installation scripts and/or any other type of data suitable for use with the methods and systems described herein.

In the exemplary embodiment, computing device 100 includes a presentation interface 108 that is coupled to processor 104. Presentation interface 108 outputs (e.g., display, print, and/or otherwise output) information such as, but not limited to, installation data, configuration data, test data, error messages, and/or any other type of data to a user 114. For example, presentation interface 108 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 108 includes more than one display device. In addition, or in the alternative, presentation interface 108 may include a printer.

In the exemplary embodiment, computing device 100 includes an input interface 110 that receives input from user 114. For example, input interface 110 may be configured to receive selections, requests, credentials, and/or any other type of inputs from user 114 suitable for use with the methods and systems described herein. In the exemplary embodiment, input interface 110 is coupled to processor 104 and may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 108 and as input interface 110.

In the exemplary embodiment, computing device 100 includes a communication interface 112 coupled to memory 106 and/or processor 104. Communication interface 112 is coupled in communication with a remote device, such as another computing device 100. For example, communication interface 112 may include, without limitation, a wired network adapter, a wireless network adapter, and/or a mobile telecommunications adapter.

Instructions for operating systems and applications are located in a functional form on non-transitory memory 106 for execution by processor unit 104 to perform one or more of the processes described herein. These instructions in the different embodiments may be embodied on different physical or tangible computer-readable media, such as memory 106 or another memory, such as a computer-readable media 118, which may include, without limitation, a flash drive, CD-ROM, thumb drive, floppy disk, etc. Further, instructions are located in a functional form on non-transitory computer-readable media 118, which may include, without limitation, a flash drive, CD-ROM, thumb drive, floppy disk, etc. Computer-readable media 118 is selectively insertable and/or removable from computing device 100 to permit access and/or execution by processor 104. In one example, computer-readable media 118 includes an optical or magnetic disc that is inserted or placed into a CD/DVD drive or other device associated with memory 106 and/or processor 104. In some instances, computer-readable media 118 may not be removable.

Figure 2:
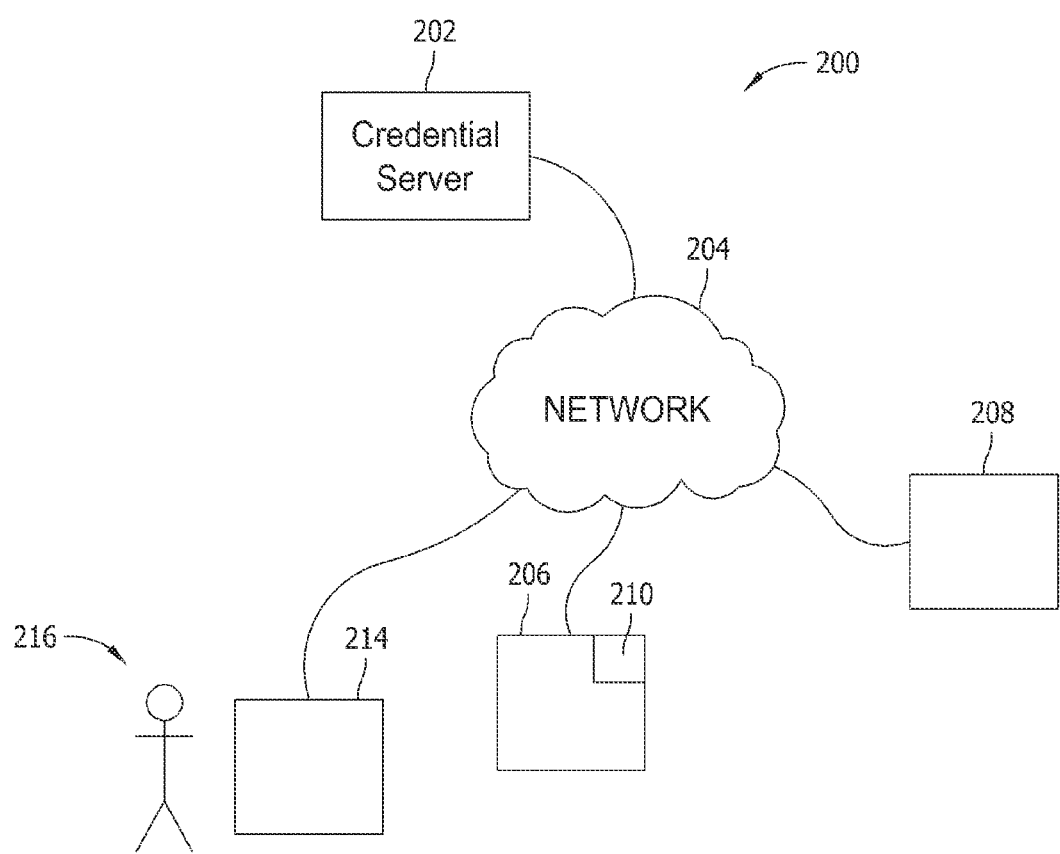
FIG. 2 is a block diagram of an exemplary computer system.

FIG. 2 illustrates an exemplary computer system 200. In this exemplary embodiment, computer system 200 includes a credential server 202. Importantly, it should be appreciated that credential server 202 may include a single server or multiple different servers for performing one or more processes described herein with reference to credential server 202. In at least one embodiment, credential server 202 includes an applications server, a structured query language (SQL) server, a web server, and/or a mail server. In such an embodiment, one or more servers may be located remotely from (i.e., spaced apart) from another server.

Credential server 202 is coupled to a network 204. Network 204 may include, without limitation, the Internet, an Intranet, a local area network (LAN), a cellular network, a wide area network (WAN), etc. In this exemplary embodiment, computer system 200 includes a workstation 206 and a workstation 208. Workstations 206 and 208 may include, for example, laptop, workstation, smart phones, PDAs, servers, programmers, or any other device suitable for an individual to access and/or execute an application. It should be appreciated that credential server 202, workstation 206, and workstation 208 are examples of computing devices 100, each of which is associated with one or more users 114 (not shown). As should be apparent, a different number of computing devices may be included with computer system 200.

As illustrated in FIG. 2, workstation 206 includes an input interface 210, which is a credential interface. Credential interface 210 may include, without limitation, a smartcard reader, a card reader, a USB port, a keyboard, a key fob reader, an RFID reader, etc. Credential interface 210 is provided to receive one or more credentials from user 114 (shown in FIG. 1), including one or more credential stored in a smartcard, a USB token, a keyfob ID number, magnetic strip card, or another type of token in the possession of user 114. As shown, the credential interface 210 is omitted from workstation 208. More specifically, in this exemplary embodiment, workstation 208 may not be configured to support multi-factor authentication, and is therefore incompatible with multi-factor authentication. Further, several applications (not shown) are hosted and/or executed by workstations 206 and 208. One or more of these applications may be incompatible with multi-factor authentication. Incompatibility with multi-factor authentication may be based on a lack of functionality of the application/device and/or a configuration of the application/device.

In this exemplary embodiment, computer system 200 is configured to substantially require multi-factor authentication to access the computer system 200. Access to computer system 200 includes, for example, access to credential server 202, workstation 206, workstation 208, another device included in computer system 200, and/or one or more applications hosted by and/or executed on one of the same. In particular, computer system 200 substantially requires at least two pieces of evidence of the identity of user 114, prior to permitting user 114 to access computer system 200. When the at least two pieces of evidence are provided, a hash value is created (through a random hash function) and associated with user 114 to permit user 114 to access one or more computing devices 100 and/or applications. In this embodiment, computer system 200 substantially requires two-factor authentication of user 114. In other computer system embodiments, three-factor or other factor authentication of user 114 may be substantially required. Further, it should be appreciated that, in other embodiments, a computer system may include at least a portion that substantially requires multi-factor authentication, while one or more other portions do not.

In order to provide access to a computing device and/or application that is incompatible with multi-factor authentication, credential server 202 is configured to receive a request for a temporary single-factor credential usable for single-factor authentication and issue the temporary single-factor credential to user 114, to permit user 114 to access such computing device and/or application. The temporary single-factor credential includes a lifetime, such that the temporary single-factor credential is automatically disabled by credential server 202, when the lifetime ends. In this manner, computer system 200 may provide an exception to the multi-factor authentication requirement, without substantially increasing the risk of an unauthorized access of computer system 200.

In the exemplary embodiment, credential server 202 provides a user interface to user 114, in order to receive a request for a credential from user 114. FIG. 3 illustrates an exemplary user interface 300. In this particular example, user interface 300 is a web-based interface provided from credential server 202 for presentation to user 114 at workstation 206 through network 204.

As illustrated, user interface 300 includes a reason field 302 for user 114 to enter a reason for requesting the temporary single-factor credential. Reasons may include, without limitation, travel, domain join operation, hardware capability, iLO Access, new server build, software compatibility, Windows 2000, and/or other reasons, etc. Different reasons may be provided in other computer systems 200 for requesting and/or receiving a temporary single-factor credential, potentially depending on the type of application/device included in computer system 200 and/or a task to be completed.

In this exemplary embodiment, reason field 302 includes a pull-down menu having a list of reasons, from which user 114 is able to select a reason. In this manner, credential server 202 may provide multiple standard reason for requesting a temporary single-factor credential, which may make review of the request for the temporary single-factor credential more efficient and/or automatic for one or more of the listed reasons. Additionally, in this particular embodiment, when user 114 selects a reason "other", a fillable field (not shown) associated with reason field 302 is provided in user interface 300 to receive from user 114 the "other" reason. Alternatively, reason field 302 may be fillable, such that user 114 is permitted to enter a reason, without a list of reasons from which to select.

Further, user interface 300 includes a duration field 304 to receive a duration of the lifetime of the temporary single-factor credential. Specifically, for example, user 114 may request a temporary single-factor credential with a lifetime of about 2 hours, 4 hours, 6 hours, 8 hours, 10 hours, 1 week, or another suitable duration. In this exemplary embodiment, duration field 304 includes a pull-down menu having a list of hours from which user 114 selects a duration. In this particular embodiment, the list of durations in duration field 304 may be specific to the reason selected in reason field 302. In at least one other embodiment, duration field 304 may be fillable, such that user 114 may request a different duration for the lifetime of the temporary single-factor credential.

When user 114 has selected a reason and a duration, a "submit request" button 306 may be selected by user 114, at workstation 208, to submit the request to credential server 202. Credential server 202, in turn, receives the request for the temporary single-factor credential and issues the temporary single-factor credential to user 114. When credential server 202 issues the temporary single-factor credential, credential server 202 modifies a user account associated with user 114, which disables the requirement for multi-factor authentication. In one example, credential server 202 sets a smartcard bit in an active directory of computer system 200 (and associated with the user account of user 114) to not require a smartcard in order to access computer system 200. In response to the modified user account, upon presenting the temporary single-factor credential, a new hash value is generated and associated with user 114 to permit access to computer system 200.

When the temporary single-factor credential is issued, the temporary single-factor credential is provided from credential server 202 for presentation to user 114 on workstation 206. Additionally, or alternatively, the temporary single-factor credential may be send by credential server 202 to user 114 through email, SMS message, etc.

Prior to issuing the temporary single-factor credential, credential server 202 may take one or more steps to evaluate the request for the temporary single-factor credential. Specifically, for example, credential server 202 may limit the number of temporary single-factor credentials issued to a single user within a predefined time period, such as a day, a week, a month, etc. In another example, credential server 202 may limit what reason will be accepted for a temporary single-factor credential, based on a position, clearance, and/or association of user 114. In yet another example, credential server 202 may provide the reason and/or duration of the request for presentation to an administrative user 114 of credential server 202, in order to evaluate the reasonability of the request. It should be appreciated that several bases for evaluation of a request for temporary single-factor credentials may be employed to inhibit issuance of unnecessary temporary single-factor credentials.

The temporary single-factor credential includes a lifetime according to the duration included in the request submitted to credential server 202. Upon issuing the temporary single-factor credential, credential server 202 tracks the lifetime of the temporary single-factor credential and disables the temporary single-factor credential when the lifetime ends, such that access to computer system 200 via the temporary single-factor credential is terminated. In this exemplary embodiment, credential server 202 checks the lifetime of temporary single-factor credentials periodically, to determine if the lifetime has ended. Periodically may include, for example, about every 2 minutes, about every 5 minutes, about every 15 minutes, about every 30 minutes, about every hour, etc. In various embodiments, credential server 202 may increment or decrement a timer to track the lifetime of the temporary single-factor credential. In such embodiments, upon expiration according to the timer, credential server 202 may automatically disable the temporary single-factor credential.

In this exemplary embodiment, upon disabling the temporary single-factor credential, credential server 202 modifies a user account associated with user 114 to re-enable the requirement for multi-factor authentication, such that a single-factor authentication (such as a password) would not grant access to computer system 200. Specifically, in one example, credential server 202 sets a smartcard bit in the active directory to require a smartcard in order to access computer system 200, such that further access to computer system 200 require multi-factor authentication. Again, in response to the modified user account, a new hash value is generated upon multi-factor authentication and associated with user 114 to permit access to computer system 200. Thus, neither the temporary single-factor credential nor the hash value associated with the temporary single-factor credential are usable to gain access to computer system 200. In this manner, computer system 200 permits implementation of multi-factor authentication on a system-wide basis, while providing an exception to access computing devices and/or applications incompatible with multi-factor authentication. The exception provides a temporary single-factor credential with a limited lifetime to user 114 (after user 114 has satisfied multi-factor authentication or another suitable authentication), thereby diminishing any increase in the risk of unauthorized access to computer system 200.

Additionally, or alternatively, when the temporary single-factor credential is disabled, credential server 202 may send an expiration message to user 114, through email, SMS message, etc., indicating the temporary single-factor credential has been or will be disabled.

In various embodiments, when user 114 is accessing computer system 200 through a temporary password, user 114 may determine that the lifetime of the temporary password is either too short or too long. In such embodiments, user 114 may interact with credential server 202 to adjust the lifetime of the temporary single-factor credential. Specifically, in this exemplary embodiment, credential server 202 provides user interface 400 (illustrated in FIG. 4) for presentation to user 114 at workstation 206. As shown, user interface 400 includes an "extend credential" button 402 and a "terminate credential" button 404. When the lifetime is determined to be too short, user 114 may select "extend credential" button 402, in order to extend the lifetime of the temporary single-factor credential. The lifetime may be extended multiple times in some embodiments, potentially requiring approval from an administrative user 114 of credential server 202. In this particular embodiment, however, user 114 is only permitted to request one extension of the lifetime of the temporary single-factor credential.

Further, if the lifetime is determined to be too long, user 114 may select "terminate credential" button 404, which effectively end the lifetime of the temporary single-factor credential, causing the temporary single-factor credential to end. As such, selecting "terminate credential" button 404 provides a request to end the temporary single-factor credential. In turn, credential server 202 receives the request and disables the temporary single-factor credentials, based on the end of the lifetime of the temporary single-factor credential.

Prior to requesting a temporary single-factor credential, user 114 may be authenticated to computer system 200. In this exemplary embodiment, user 114 may be authenticated to computer system 200 in two ways: multi-factor authentication at workstation 206 or authentication through a help desk workstation 214. Multi-factor authentication may be accomplished, at workstation 206, for example, by presenting a smartcard to credential interface 110 and entering a pin number, thereby providing at least two pieces of evidence of the identity of user 114. As should be apparent, other types of evidences (e.g., devices, numbers and/or passwords, etc.) may be provided in various forms to satisfy multi-factor authentication requirement of workstation 206. Upon accessing workstation 206, user 114 may request a temporary single-factor credential through user interface 300, as described above. In several embodiments, credential server 202 may rely on multi-factor authentication performed by workstation 206 to permit user 114 to request the temporary single-factor credential. Referring to FIG. 3, user information 306 (e.g., name, username, employee identification number, network designator, etc.) is received by credential server 202 from workstation 206, in order to invoke user interface 300. In this particular example, user information 306 is provided for presentation by credential server 202 to workstation 206 within user interface 300. In at least one embodiment, user 114 is only permitted to request temporary single-factor credentials for user 114, not another user.

Alternatively, in at least one embodiment, user 114 may contact help desk workstation 214, which is utilized by another user, such as operator 216. In such an embodiment, operator 216 solicits sufficient user information to authenticate the identity of user 114, through the use of, for example, security questions, personal information, passwords, etc. Once operator 216 is satisfied user 114 has sufficiently authenticated his/her identity, operator 216 utilized help desk workstation 214 to access a user interface substantially similar to user interface 300, but configured to permit requesting a temporary single-factor credential for another user 114.

Figure 5:
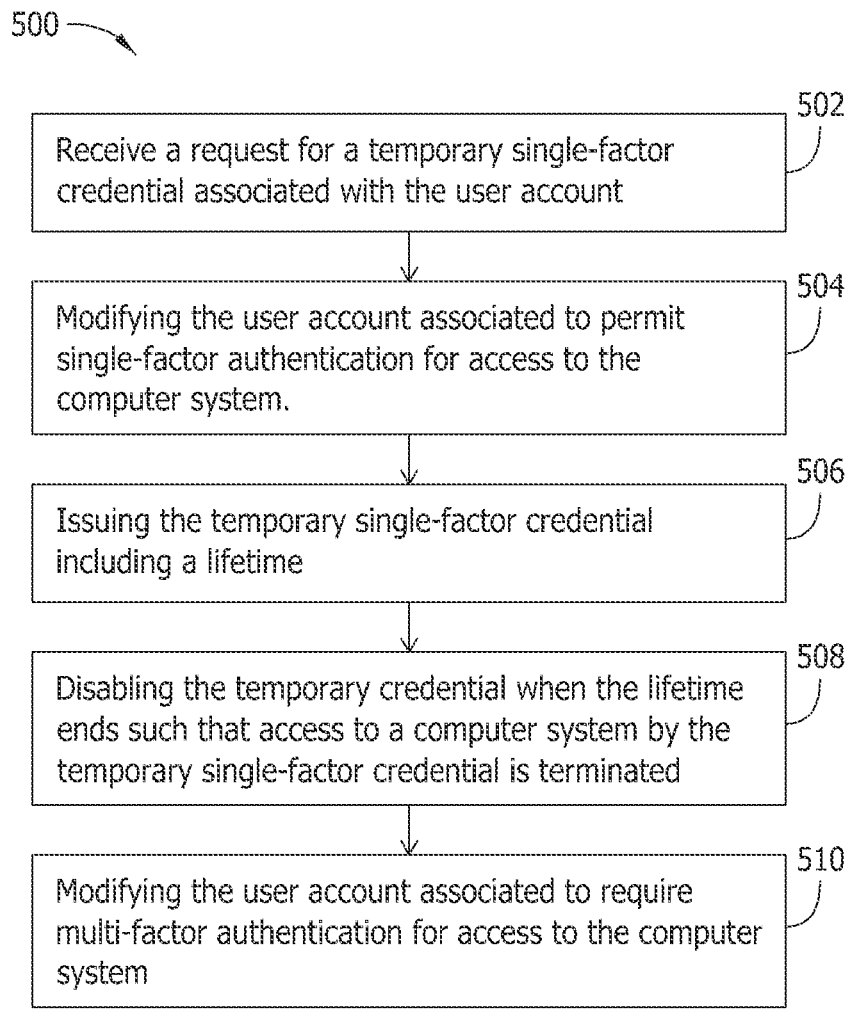
FIG. 5 illustrates a block diagram of an exemplary method for controlling access to a computer system.

FIG. 5 illustrates an exemplary method 500 for use in controlling access to a computer system 200. While method 500 is described with reference to computer system 200, it should be understood that method 500 is not limited to computer system 200, and may be practiced with other computer systems. Further, computer system 200 should not be understood to be limited to methods 500.

Method 500 includes receiving 502 a request for a temporary single-factor credential associated with a user account, modifying 504, at credential server 202, the user account associated to permit single-factor authentication for access to computer system 200, issuing 506, at credential server 202, the temporary single-factor credential including a lifetime, disabling 508, at credential server 202, the temporary single-factor credential, when the lifetime ends, such that access to computer system 200 via the temporary single-factor credential is terminated, and modifying 510, at credential server 202, the user account to require multi-factor authentication for access to computer system 200.

In various embodiments, method 500 includes modifying, at credential server 202, the user account associated to permit single-factor authentication for access to computer system 200, when the temporary single-factor credential is issued. In such embodiments, a temporary password may satisfy the single-factor authentication. In some embodiments, method 500 includes receiving multi-factor authentication from user 114 prior to modifying, at credential server 202, the user account. Method 500 may also include providing for presentation to user 114 web-based user interface 300 to solicit the request from user 114. Further, method 500 may also include receiving a request to extend the temporary single-factor credential through web-based user interface 300 and modifying the lifetime of the temporary single-factor credential. Further still, method 500 may include receiving a request to end the lifetime of the temporary single-factor credential.

One or more aspects of the present disclosure transform a general-purpose computing device into a special-purpose computing device when configured to execute the instructions described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling access to a computer system, said method is implemented by a credential server computing device, said method comprising:
receiving, by the credential server computing device, a first request from a workstation computing device, for a temporary single-factor credential associated with a user account;
receiving, by the credential server computing device, a reason selection transmitted from the workstation computing device, wherein the reason selection specifies a reason for requesting the temporary single-factor credential;
generating, by the credential server computing device, a plurality of selectable lifetimes in a list for the temporary single-factor credential based on the reason selection transmitted from the workstation computing device;
transmitting, by the credential server computing device, the plurality of selectable lifetimes to the workstation computing device;
modifying, at a computing device, the user account from requiring multi-factor authentication to permitting single-factor authentication for access to the computer system;
issuing, from the credential server computing device to the workstation computing device, the temporary single-factor credential;
receiving a second request to extend the lifetime of the temporary single-factor credential through a web-based user interface and extending the lifetime of the temporary single-factor credential in response to the request;
receiving, at the credential server computing device, the temporary single-factor credential;
upon receiving the temporary single-factor credential, generating a hash value and associating the hash value with the user account to permit access to the computer system;
disabling, at the computing device, the temporary single-factor credential, when the lifetime ends, such that access to the computer system via the temporary single-factor credential is terminated; and
modifying, at the credential server computing device, the user account to require multi-factor authentication for access to the computer system.

2. The method of claim 1, wherein the temporary single-factor credential includes a temporary password.

3. The method of claim 1, wherein issuing the temporary single-factor credential includes issuing the temporary single-factor credential for one of the workstation computing device and an application incompatible with multi-factor authentication.

4. The method of claim 3, further comprising receiving multi-factor authentication from a user prior to modifying, at the credential server computing device, the user account to permit single-factor authentication.

5. The method of claim 1, further comprising providing for presentation to a user the web-based user interface to receive the first request from the user.

6. The method of claim 1, wherein the lifetime of the temporary single-factor credential includes one of about 2 hours, about 4 hours, about 10 hours, and about 1 week.

7. The method of claim 6, further comprising receiving a third request to end the lifetime of the temporary single-factor credential.

8. The method of claim 1, wherein the multi-factor authentication is two-factor authentication.

9. A credential server for use in controlling access to a computer system, said credential server comprising:
a memory device storing a user account; and
a processor coupled to the memory device, said processor configured to:
receive a first request from a workstation computing device for a temporary single-factor credential associated with the user account;
receive a reason selection transmitted from the workstation computing device, wherein the reason selection specifies a reason for requesting the temporary single-factor credential;
generate a plurality of selectable lifetimes in a list for the temporary single-factor credential based on the reason selection transmitted from the workstation computing device;
transmit the plurality of selectable lifetimes to the workstation computing device;
modify the user account from requiring multi-factor authentication to permitting single-factor authentication for access to the computer system;
issue the temporary single-factor credential to the workstation computing device;
receive a second request to extend the lifetime of the temporary single-factor credential through a web-based user interface and extend the lifetime of the temporary single-factor credential in response to the request;
receive the temporary single-factor credential;
upon receiving the temporary single-factor credential, generate a hash value and associate the hash value with the user account to permit access to the computer system;
disable the temporary single-factor credential, when the lifetime ends, such that access to the computer system via the temporary single-factor credential is terminated; and
modify the user account to require multi-factor authentication for access to the computer system.

10. The credential server of claim 9, wherein said processor is further configured to end the lifetime of the temporary single-factor credential in response to a third request from a user.

11. The credential server of claim 9, wherein said processor is further configured to send a message to a user associated with the user account, when the temporary single-factor credential is disabled.

12. The credential server of claim 11, wherein said processor is further configured to provide the web-based user interface for presentation to a user, the web-based user interface including a reason field to receive the reason for issuing the temporary credential.

13. The credential server of claim 9, wherein said processor includes a plurality of processors, a first one of said plurality of processors being located remote from a second one of said plurality of processors, and
wherein said first one of said plurality of processors is configured to receive the first request for a temporary single-factor credential associated with the user account, and said second one of said plurality of processor is configured to issue the temporary single-factor credential having the lifetime.

14. One or more non-transitory computer-readable storage media having computer-executable instructions embodied thereon, wherein when executed by at least one processor, the computer-executable instructions cause the processor to:

receive a first request from a workstation computing device for a temporary single-factor credential associated with a user account;

receive a reason selection transmitted from the workstation computing device, wherein the reason selection specifies a reason for requesting the temporary single-factor credential;

generate a plurality of selectable lifetimes in a list for the temporary single-factor credential based on the reason selection transmitted from the workstation computing device;

transmit the plurality of selectable lifetimes to the workstation computing device;

modify the user account from requiring multi-factor authentication to permitting single-factor authentication for access to a computer system;

issue the temporary single-factor credential to the workstation computing device;

receive a second request to extend the lifetime of the temporary single-factor credential through a web-based user interface and extend the lifetime of the temporary single-factor credential in response to the request;

receive the temporary single-factor credential;

upon receiving the temporary single-factor credential, generate a hash value and associate the hash value with the user account to permit access to the computer system;

modify the user account associated to permit single-factor authentication for access to the computer system; and disable the temporary credential, when the lifetime ends, such that access to the computer system via the temporary single-factor credential is terminated.

15. The one or more non-transitory computer-readable storage media of claim 14, wherein when executed by the at least one processor, the computer-executable instructions further cause the processor to modify, after the temporary single-factor credential is disabled, the user account associated to permit multi-factor authentication for access to the computer system.

16. The one or more non-transitory computer-readable storage media of claim 14, wherein when executed by the at least one processor, the computer-executable instructions further cause the processor to end the lifetime of the temporary single-factor credential in response to a third request from a user.

17. The one or more non-transitory computer-readable storage media of claim 14, wherein when executed by the processor, the computer-executable instructions further cause the at least one processor to provide the web-based user interface for presentation to a user, the web-based user interface indicating the user account.

\* \* \* \* \*